Sept. 22, 1964  V. F. WIGAL  3,149,802
AUTOGIRO
Filed Sept. 11, 1961  5 Sheets-Sheet 1
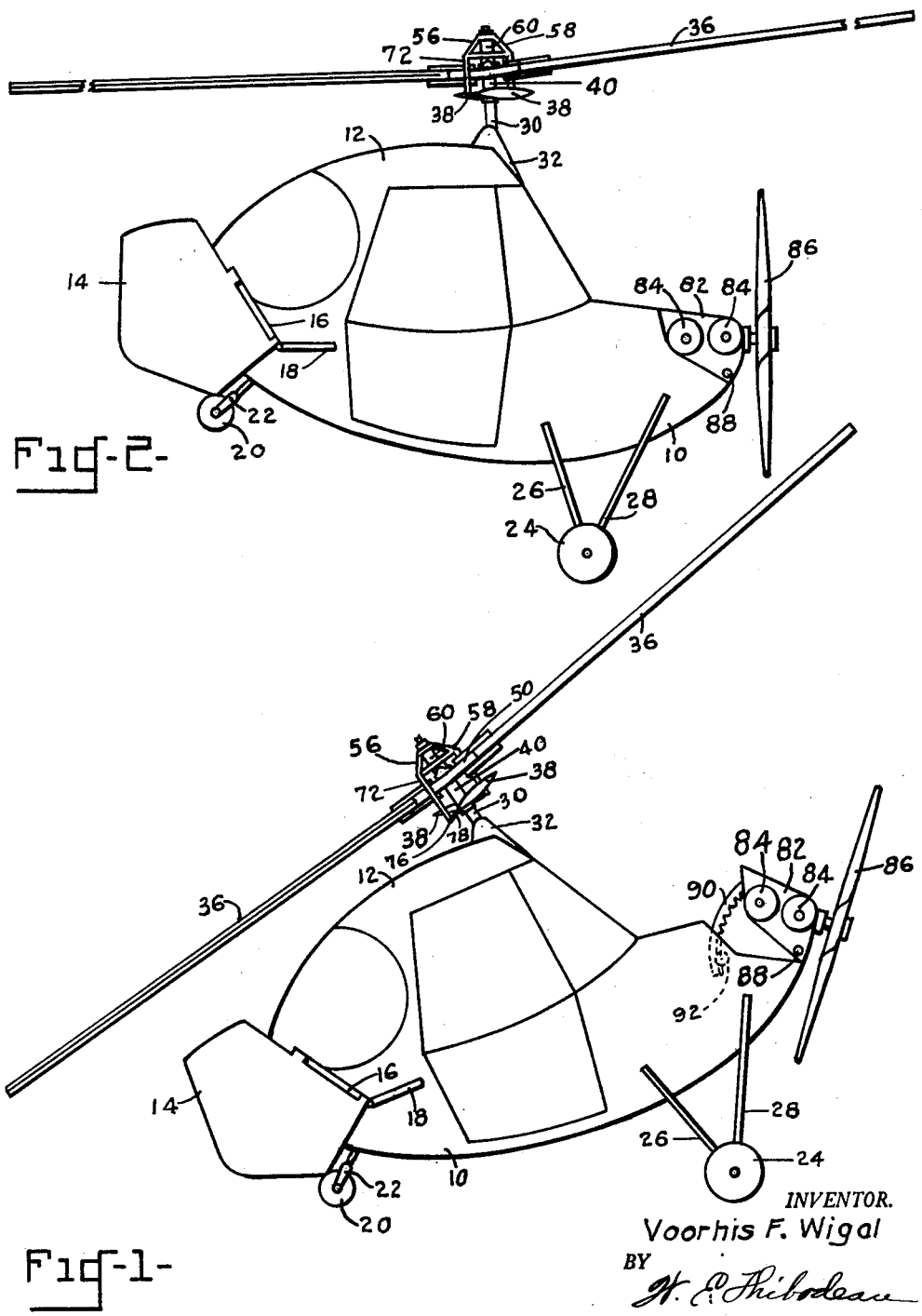
INVENTOR.
Voorhis F. Wigal
BY

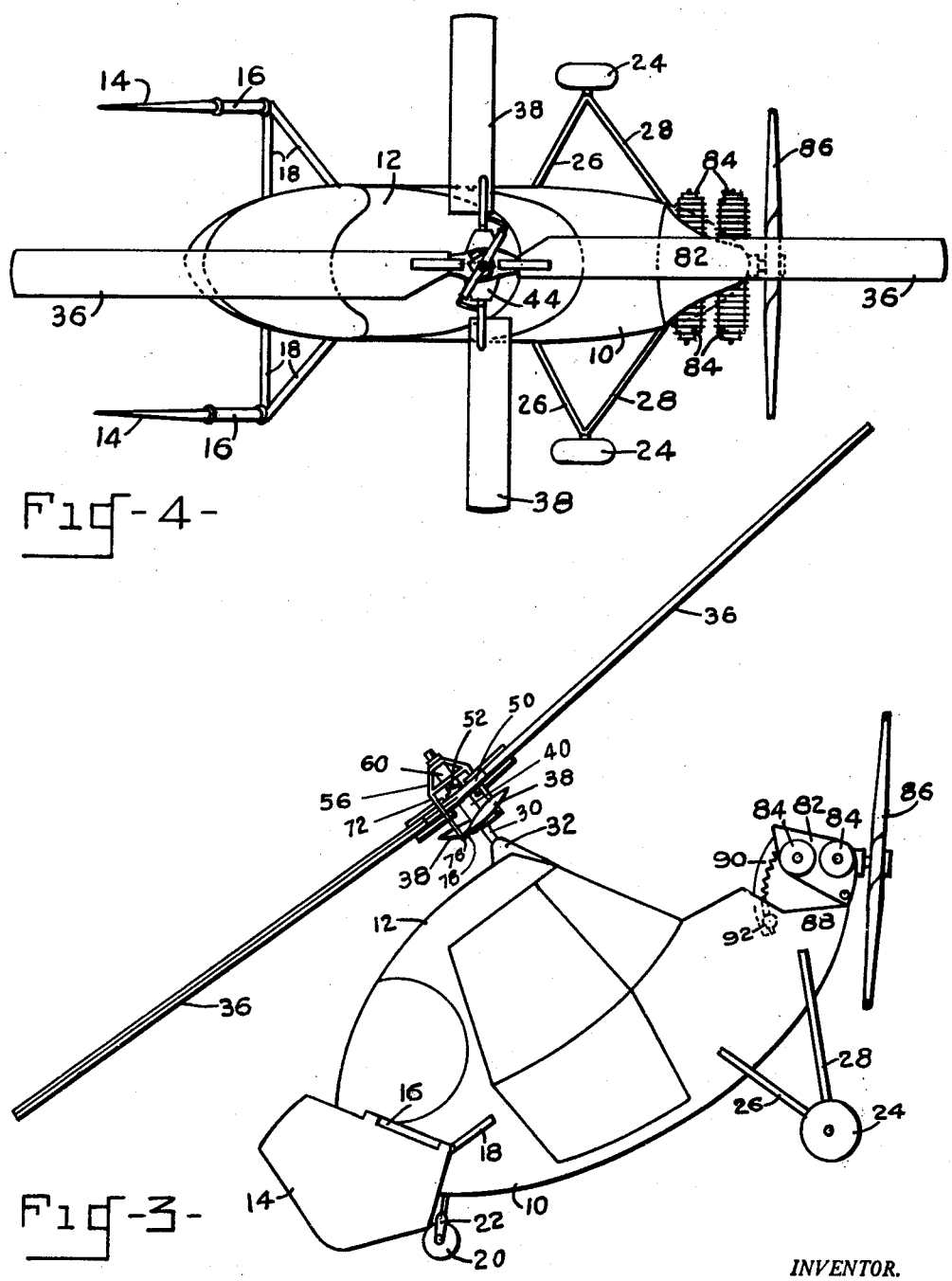

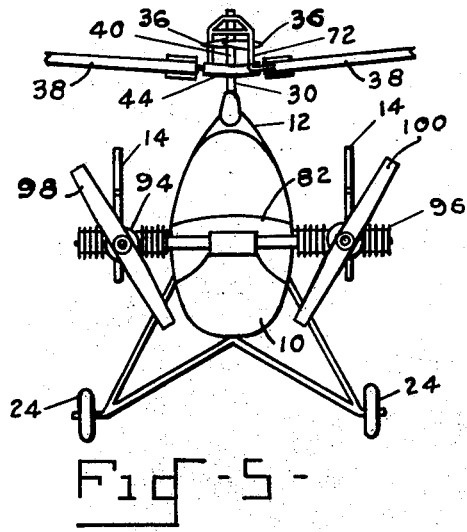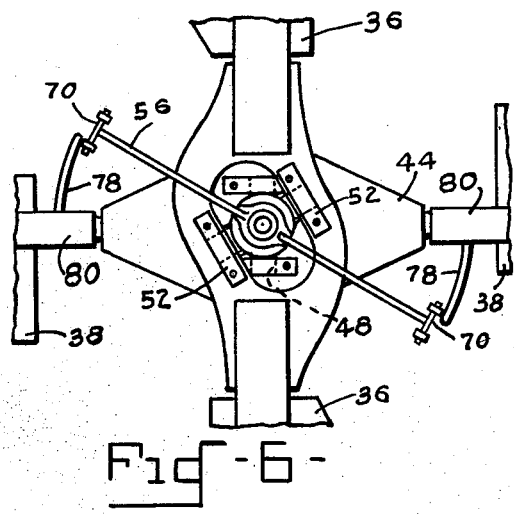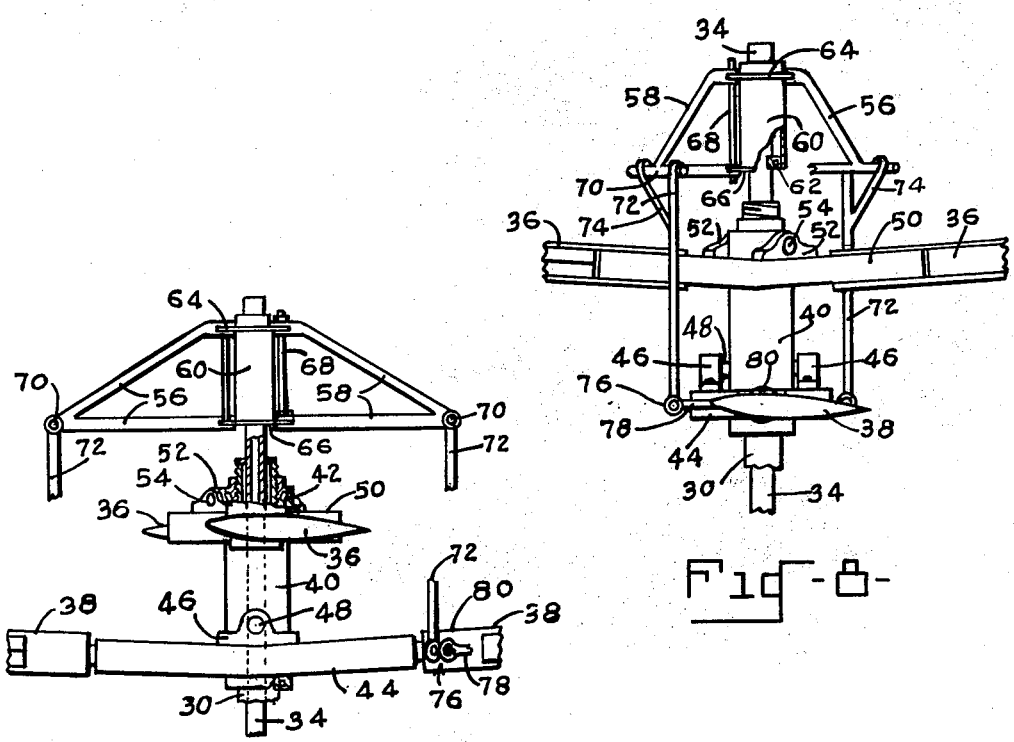

Sept. 22, 1964
V. F. WIGAL
3,149,802
AUTOGIRO
Filed Sept. 11, 1961
5 Sheets-Sheet 4
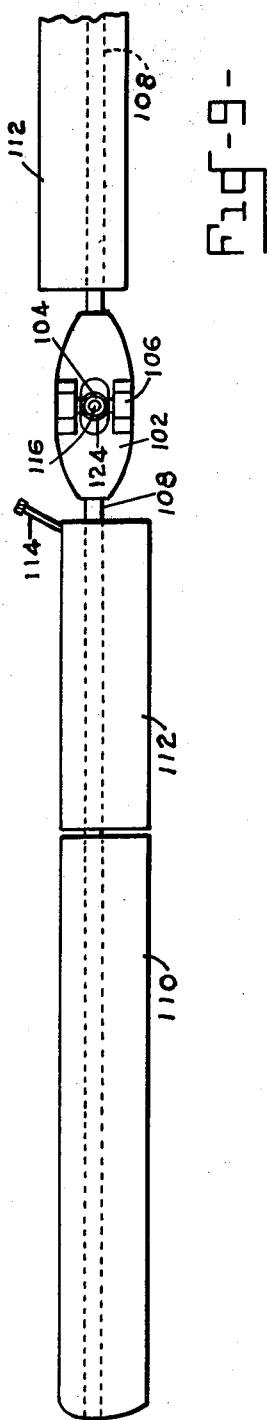
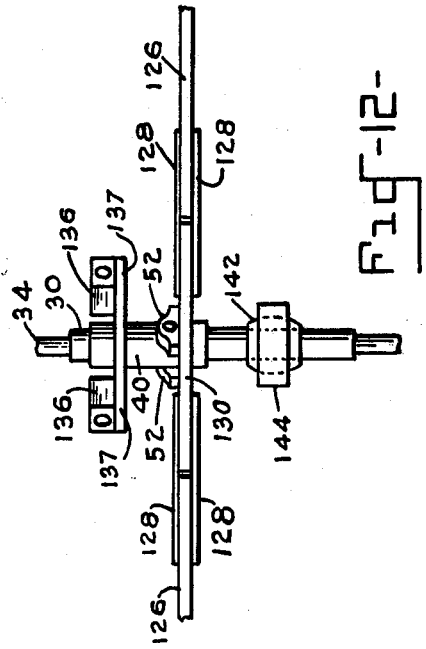
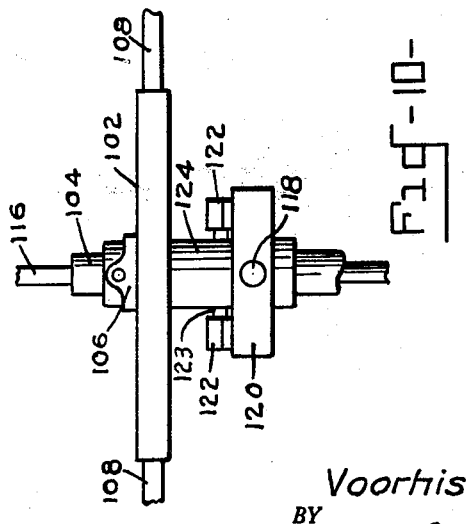
INVENTOR.
Voorhis F. Wigal
BY
H. E. Thibodeau

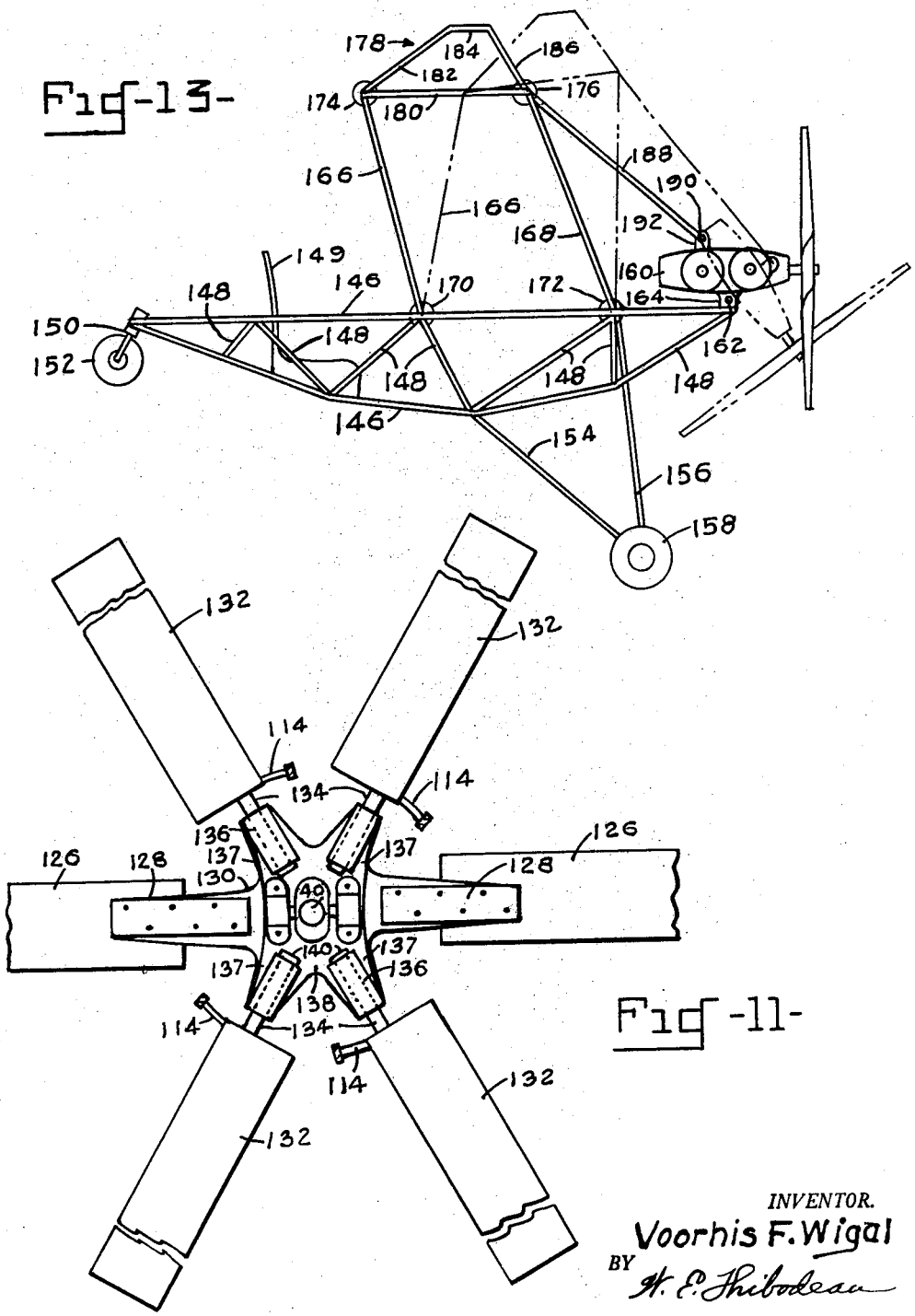

United States Patent Office 3,149,802
Patented Sept. 22, 1964

3,149,802
AUTOGIRO
Voorhis F. Wigal, 909 Highland Ave., Jackson, Tenn.
Filed Sept. 11, 1961, Ser. No. 137,314
21 Claims. (Cl. 244—17.11)

This invention relates to autogiro type aircraft, and in particular to a novel autogiro which is capable of direct lift and hovering, without the need for gear drives to the rotor with disconnecting features.

The autogiro is a rotary wing aircraft with a free-turning rotor, which is caused to autorotate from the flow of air past it when the craft is drawn forward by an engine-driven propeller, as in the case of a conventional plane. Although the original autogiro was superior to fixed-wing planes in its ability to maintain lift at lower forward speeds, and to take off and land in much smaller spaces, it nevertheless was incapable of direct, vertical lift, or of hovering, since it depended on motion of the airstream past the rotor blades to keep them moving. Attempts have been made to overcome these shortcomings, and one proposal provided for a temporary driving connection between the engine and the rotor. However, this involved a torque reaction when the machine was in the air, thus necessitating a quick disconnecting of the drive prior to take-off. With this arrangement vertical, jump take-offs were possible, but the machine was still not capable of hovering flight, and in this respect was therefore inferior to the helicopter.

It is therefore an object of the present invention to provide an autogiro which is capable of vertical or nearly vertical take-off. A related object is to provide for hovering flight of an autogiro. More particularly, it is an object to provide the aforesaid advantageous features without the need for communicating drive to the rotor from the power plant in the craft.

These and other objects, which will be readily apparent, are attained by the present invention, which may be briefly described as comprising a rotor system having auxiliary rotors lying in the path of the airstream, and having pitch adjustment for attaining a high negative pitch, so as to be rotated, windmill-fashion, by the airstream, and being connected to the main rotors so as to set them in rotation. In furtherance of this action, the parts of the system are adjustable, so that the pitch for the windmilling effect may be set at an optimum degree during take-off or hovering, and converted to a pitch comporting with autorotation during normal, forward flight. Means are also provided for shifting the center of gravity of the craft, to comport with the different positions of adjustment.

For a more detailed description of the invention, reference is made to the following specification, as illustrated in the drawings, in which:

FIGURE 1 is a side elevational view of an autogiro, according to the invention, in position on the ground, prior to, and set for, a forward take-off, FIGURE 2 is a side elevational view, showing the machine in an attitude of forward flight, FIGURE 3 is a side elevational view, showing the machine in an attitude for hovering, or vertical take-off, FIGURE 4 is a top plan view of the machine shown in FIGURE 2, FIGURE 5 is a front view of a machine such as shown in FIGURE 2, showing a modification employing dual propellers, FIGURE 6 is a fragmentary view, enlarged, of a detail taken axially of the rotor mast, from above, FIGURE 7 is a fragmentary view showing details of the rotor mast, as viewed from one end of the upper, main rotor, with the top truss rotated into the plane of the paper, FIGURE 8 is a view similar to FIGURE 7, rotated through 90°, with the lower, auxiliary rotors showing endwise, FIGURE 9 is a top plan view of a portion of a modified rotor, with the main rotor and auxiliary rotor combined, FIGURE 10 is a fragmentary view, showing a side elevation of a modified rotor mast such as that of FIGURE 9, as seen from below in FIGURE 9, FIGURE 11 is a top plan view of a modified rotor, in which the auxiliary rotors are four in number, and the two main rotors are located below the auxiliaries, FIGURE 12 is a side elevational view of the rotor of FIGURE 11, and FIGURE 13 is a schematic view, showing, in side elevation, a craft having a compensating linkage, for shifting the center of gravity.

Referring to the drawings by characters of reference, there is shown, in FIGURES 1 to 5, an aircraft of the rotating wing type, having a fuselage 10 and a cab 12 enclosing the operator's compartment. A pair of rudders 14, on opposite sides of the cab, are swing mounted on hinges 16, carried by spread-leg braces 18, fixed to the fuselage. The rudders will be equipped with suitable controls, as understood in the art. The three-point landing gear comprises a single, rear wheel 20, carried in a fork mount 22, secured to the fuselage, and a pair of front wheels 24, each carried by a pair of struts 26, 28, secured at the front of the fuselage on opposite sides thereof. It will be noted, particularly in FIGURE 1, that the struts of the front wheel carriages are of such a length that the craft has a distinct tilt upwardly in a forward direction when on the ground. This arrangement is related to the cooperative action between the propeller and the windmilling rotor, in that it avoids turning of the propeller axis too far toward the ground when the engine is tilted.

The main rotor is universally tiltable, throughout a full range of 360°, for control purposes, as understood in the art, and according to the present invention, this tilting, especially in a vertical plane running fore and aft of the craft, has a cooperative relation with the novel aspects of the invention, in the realization of the ends thereof. The mast 30, on which the rotor system is freely rotatable, extends from a domed housing 32, atop the craft, and the mast, or shaft, is tubular, to slidingly receive an operating rod 34, which communicates the pitch control to the auxiliary rotors. Both the main rotors 36 and the auxiliary rotors 38 are attached to a sleeve 40, having anti-friction bearings 42 at top and bottom, through which it is rotatably mounted on mast 30. Auxiliary rotors 38 are considerably shorter than the main rotors, since any length beyond that which is capable of efficiently picking up the available energy in the airstream from the propeller, would only add to inertia and drag. The comparative lengths of main rotors 36, auxiliary rotors 38, and the propeller 86, are evident in FIGURE 4.

The main and auxiliary rotors are carried by sleeve 40 in a mounting which permits limited rocking in a vertical plane, as known in the art. Thus, the pair of rotors 38 are connected through a central plate or hub 44 with a central opening to be received by the sleeve 40, and the plate carries a pair of bearing blocks 46 on opposite sides of the opening, which blocks are mounted on trunnions 48, extending laterally from sleeve 40 near the bottom thereof. Similarly, blades 36 have a central plate 50, with bearing blocks 52, mounted on trunnions 54. In the arrangement shown, although the main and auxiliary rotors are at all times disposed 90° apart, the trunnion axis of the main rotor blades 36 is angularly offset from this 90° spacing. With this arrangement, the blades quickly readjust to maintain their spinning plane perpendicular to the support mast, such as when the mast is moved, or a gust rocks the rotor, due to the fact that the high blade decreases its angle of attack, while the low blade has a corresponding increase, which assists centrifugal force in bringing the blades square with the mast. However, a normal arrangement of the axes of the two sets of bearing blocks 90° apart, as shown, for instance, in FIGURE 10, is also contemplated.

For autorotation, the optimum pitch of the main rotor is about 0° and the main rotor may or may not have pitch control, and since the essential principles of the present invention may be illustrated in connection with a main rotor with fixed pitch, no pitch control for the main rotor has been shown. However, it will be understood that conventional pitch control may be employed to effect certain desirable variations, as for increasing the lift effect, for instance. For the windmilling effect of the auxiliary blades 38, however, these are provided with a pitch control which is capable of producing a relatively high, negative pitch, so as to most effectively pick up the energy from the propeller stream, and set the main blades revolving at proper speed for the wing-type lift.

In the pitch control system, a pair of triangular trusses 56, 58, extend from opposite sides of a housing 60 rotatably mounted on slide rod 34, above the blades, through anti-friction bearings 62. Although rod 34 slides, it does not rotate. Truss 56 is rigidly fixed to upper and lower flanges 64, 66 on housing 60, while truss 58 is arranged for limited play about a vertical axis, being pivoted on a rod 68, carried by flanges 64, 66. Each truss has a T cross bar 70, one end of which pivotally carries a vertical control rod 72, the other end of the T being pivoted in a brace rod 74, extending from the control end. At their lower ends, rods 72 have universal connections 76 with rods 78, extending from the spars 80 of the rotors 38. Since the rotor blades have their leading edges oppositely disposed on opposite sides of the mast, it will be seen that any movement of rod 34 in one direction will cause both blades to either increase or decrease the angle of attack, simultaneously.

In order to obtain optimum performance of the auxiliary rotor, the engine of the craft is mounted for swinging movement, so that the full effect of the airstream from the propeller may be applied to that rotor during take-off or hovering, the engine being swung back to normal position for forward flight. For illustrative purposes, the swing mounting of the engine has been shown in relatively simple form, with an engine block 82 having air-cooled radial cylinders 84, and mounting a propeller 86, the block being swingably mounted on a shaft 88 carried by the fuselage framework, whereby the engine block is tiltable about a horizontal axis extending laterally of the craft. Any convenient, mechanical means may be employed to tilt the engine, and in the embodiment shown this comprises an arcuate rack 90, fixed to the rear of the engine, and actuated by a pinion 92, journalled in the craft, which pinion may be hand-operated or connected to a source of power.

The operation of the craft will now be set forth, with respect to so much of the structure shown in the drawings as has been described above. FIGURE 1 shows the craft with the parts in position for take-off, with the rotor mast tilted backward, and the engine tilted forward. With the parts in this position the airstream is thrown centrally of the main rotor, and well within the circle thereof, but the auxiliary rotor lies wholly within the stream. Through the variable, collective pitch control of the small rotor, the pitch is set to a relatively high negative value, so that it is set in rotation by the air stream, carrying with it the main rotor, which is thereby brought up to flying speed independently of any forward movement of the craft. Thus, a take-off from a very short run may be effected, since the distance formerly employed in forward movement to bring the rotor up to speed has been eliminated. Once the main rotor reaches flying speed, the auxiliary rotor is restored to optimum pitch for autorotation. If faster climb is desired this setting may be preceded by a momentary setting at a high positive pitch. At this stage, the engine is swung back to normal flight position (FIGURE 2) and the craft shifts to normal crusing attitude, with little or no forward roll.

If direct vertical take-off, or hovering flight are desired, the main rotor will be of the type having pitch control, so that after the main rotor speed has been built up through action of the windmilling rotor, positive pitch may be applied to the main rotor, and the nose of the craft is lifted from the ground to a position such as shown in FIGURE 3. From this position, vertical flight may be continued or horizontal flight commenced, in which latter case the pitches of both rotors are brought to the autorotation value, and the rotor mast and engine are restored to normal position.

Since there may be some likelihood that gyroscopic precessional forces may cause some control problems in the case of a craft with a single engine, it may be desirable to use two engines, such as 94, 96, on opposite sides of the fuselage, as shown in FIGURE 5, and equipped with correspondingly smaller propellers 98, 100 with a range of action suited to the size and location of the auxiliary rotor. Propellers 98, 100 have opposite pitch, and rotate in opposite directions, so that the gyroscopic forces engendered are mutually cancelled.

In the modification shown in FIGURE 9, the blades of the main rotor and of the windmilling rotor have been combined on a common spar, only one complete set of blades being shown in the figure. The rotor has a central plate 102, trunnion-mounted through rocker bearing blocks 106, on a sleeve 124, surrounding a mast 104. Extending from opposite sides of the central plate are the spars 108, each carrying on its outer portion a main rotor blade 110, which may be fixed on the spar at an autorotating pitch, or may be equipped with conventional pitch controls. Inwardly of the main blade, and in closely adjacent end-to-end relation thereto, is the auxiliary blade 112, having a longitudinally extending bore by which it is received on spar 108 for pitch-adjusting rotation. For controlling this pitch, the inner blade 112 has a laterally extending horn 114, which is connectible, through suitable linkage with the slide rod 116 in the mast 104. In this more compact arrangement, radially in tandem, the general modes of action, and the sequence of control operations are substantially the same as in the case of the separate rotors, and it is therefore unnecessary to repeat a discussion of the operation.

In FIGURE 10 is shown a modification in which two sets of blades of the composite type shown in FIGURE 9 are employed, with a pair of spars 118, carried by a center plate 120, attached through rocker bearings 122 to trunnions 123, carried by a bearing sleeve 124 depending from plate 102, lower spar 118 being arranged at right angles to upper spar 108, and the axes of the two sets of bearing blocks being perpendicular to the axes of the respective sets of spars with which they are associated, and therefore arranged at right angles to each other.

In the modification shown in FIGURES 11 and 12 the main and auxiliary rotors are separate, as in the modification shown in FIGURES 1 to 8, but in order to achieve greater torque, the stub blades of the auxiliary rotor have been increased to four, and these have been located above the main rotor blades, which puts the main rotor closer to the support point, and reduces back loads on the controls. As shown, the two main rotor blades 126 are secured by riveted, connector plates, or spints, 128, to the oppositely extending ends of a hub or center plate 130, the mounting on the mast being the same as in the other modifications, and therefore bearing the same reference numerals used in connection therewith.

The windmilling stub rotors 132, located above the main rotor, are four in number, and equi-angularly spaced in the two 180° intervals between the two main rotor blades, each having a spar 134 extending from its inner end, which is journalled in a bore in a square block 136, extending radially from the mast and fixed on one of four legs 137, extending from a central plate or hub 138, the spars being retained in the bearing blocks by headed, inner ends 140. The stub blades and their spars are omitted in FIGURE 12. As in the case of the FIGURE 9 modification, the stub blades 132 have extending horns 114 for pitch control. In the FIGURE 12 device, universal tilt of the mast, mentioned above, has been provided for with a spherical bearing having a male element 142 carried by the mast, and a mating socket 144 carried by the framework of the craft. In lieu of this, a gimbal arrangement may be employed.

The shift of the mast, and also of the engine, entail a shift in the center of gravity of the craft, for which compensation should be made. One manner of accomplishing this is shown in FIGURE 13, wherein, for the sake of clarity, and easier understanding, the craft and its parts have been skeletonized, and several parts not essential to the compensating structure omitted. Thus, of the fuselage, only the frame 146 is shown, together with truss struts 148 and a seat 149. As in the craft described above, the mount 150 for the rear wheel 152 is short, and the struts 154, 156, for the front wheels 158 are long. The engine 160 is medially pivoted, on its underside, on a shaft 162, carried by a bracket 164 on the forward end of the craft.

The compensating linkage for shifting the center of gravity comprises a quadrilateral linkage, or cage, with corner angles variable on horizontal axes. As viewed from one side of the craft, in FIGURE 13, the cage comprises a pair of upright links 166, 168, pivoted, respectively at points 170, 172, on the upper part of the frame 146 of the craft. It will be understood that the cage is three-dimensional, and that companion links to those shown in FIGURE 13 will be mounted on the other side of the craft. The upper ends of links 166, 168, are pivoted at points 174, 176, at the front and rear ends of a block member, or plyon, 178, which, of itself, is a rigid structure in which the tiltable mast is to be mounted, but which is merely shown in outline as comprising four straight sides, 180, 182, 184 and 186. From the pivot point 176, a control link 188 leads to the top of engine 160, being there pivotally connected to a shaft or pin 190, carried by a bracket 192 on the engine.

From the foregoing, the compensating action will be clear. With the parts positioned as shown in solid lines, the aerodynamic components of the craft are properly located with respect to the center of gravity, for normal forward, or cruising, flight. When the craft is set down, or is hovering, it will be in a noseup position, and the engine will be pointing downward. During movement of the engine downward, the links 188 communicate a pull on the top of the mast-supporting cage which moves it forward, thus also shifting the center of gravity of the entire system forward, compatible with the relocation of the engine and of the mast. Not only is this automatic compensation effective at the terminal positions of the parts, but also at intermediate positions, so that there is compensation at all times, with smooth transition, and no abrupt changes.

From the foregoing, it will be seen that there has been provided an aircraft of the autogiro type which is capable of pre-rotating the rotary wing without forward motion of the craft, and to accomplish this without the need for connecting the rotor to the engine or other power supply, and disconnecting it therefrom. Not only is this economical of material and parts, and maintenance cost, but is smooth, reliable in operation, requiring no sudden, violent, control changes, and in addition, presents the distinct advantage of enabling direct, vertical take-off as well as hovering flight, thus combining the main advantages of the helicopter with those of the autogiro, while eliminating their prime disadvantages.

Generally speaking, whereas certain, preferred modifications have been shown and described, various modifications will become apparent to those skilled in the art, in the light of this disclosure, and the invention should not, therefore, be deemed as limited, except insofar as shall appear from the spirit and scope of the appended claims.

I claim:

1. A rotary wing aircraft having a generally vertical, tubular mast arranged for limited, tilting action, at least in a plane, fore and aft of the craft, a sleeve mounted for free rotation on said mast, a first hub mounted on said sleeve for limited rocking movement on a central axis transverse to the mast, a plurality of main rotor blades carried by said hub, a second hub carried by said sleeve, below said first hub, mounted for limited, rocking movement on an axis transverse to the mast both said hubs being fixed to said sleeve, for rotation therewith, a plurality of auxiliary rotor blades carried by said second hub, substantially shorter than said main blades, and arranged for rotation about a longitudinal axis for pitch variation, a rod slidably mounted in said mast, links pivotally connected to the upper end of said rod and to the respective, said auxiliary blades, an engine having a propeller carried on the frame of said aircraft, and mounted for swinging movement about a horizontal axis, transverse to the craft to vary the center line of the path of the airstream from the propeller from a direction corresponding to normal forward flight to a direction generally toward the center of rotation of said auxiliary blades, and landing gear on said craft, including a forward unit adapted to hold the forward end of the craft upwardly inclined with respect to its normal attitude in forward flight.

2. A rotary wing aircraft having a generally vertical, tubular mast arranged for limited, tilting action, at least in a plane, fore and aft of the craft, a sleeve mounted for free rotation on said mast, a first hub mounted on said sleeve for limited rocking movement on a central axis transverse to the mast, a plurality of main rotor blades carried by said hub, a second hub carried by said sleeve, above said first hub mounted for limited, rocking movement on an axis transverse to the mast, both said hubs being fixed to said sleeve for rotation therewith, a plurality of auxiliary rotor blades carried by said second hub, substantially shorter than said main blades, and arranged for rotation about a longitudinal axis for pitch variation, a rod slidably mounted in said mast, links pivotally connected to the upper end of said rod and to the respective, said auxiliary blades, an engine having a propeller carried on the frame of said aircraft, mounted for swinging movement about a horizontal axis, transverse to the craft, to vary the center line of the path of the airstream from the propeller from a direction corresponding to normal forward flight to a direction generally toward the center of rotation of said auxiliary blades, and landing gear on said craft, including a forward unit adapted to hold the forward end of the craft upwardly inclined with respect to its normal attitude in forward flight.

3. A rotary wing aircraft having a generally vertical, tubular mast arranged for limited, tilting action, at least in a plane, fore and aft of the craft, a sleeve mounted for free rotation on said mast, a first hub mounted on said sleeve for limited rocking movement on a central axis transverse to the mast, a plurality of main rotor blades carried by said hub, a second hub carried by said sleeve, mounted for limited, rocking movement on an axis transverse to the mast, both said hubs being fixed to said sleeve for rotation therewith, a plurality of auxiliary rotor blades carried by said second hub, substantially shorter than said main blades, and arranged for rotation about a longitudinal axis for pitch variation, a rod slidably mounted in said mast, links pivotally connected to the upper end of said rod and to the respective, said auxiliary blades, an engine having a propeller carried on the frame of said aircraft, mounted for swinging movement about a horizontal axis, transverse to the craft to vary the center line of the path of the airstream from the propeller from a direction corresponding to normal forward flight to a direction generally toward the center of rotation of said auxiliary blades, and landing gear on said craft, including a forward unit adapted to hold the forward end of the craft upwardly inclined with respect to its normal attitude in forward flight.

4. A rotary wing aircraft having a generally vertical, tubular mast arranged for limited, tilting action, at least in a plane, fore and aft of the craft, a sleeve mounted for free rotation on said mast, a first hub mounted on said sleeve, a plurality of main rotor blades carried by said hub, a second hub carried by said sleeve, both said hubs being fixed to said sleeve for rotation therewith, a plurality of auxiliary rotor blades carried by said second hub, substantially shorter than said main blades, and arranged for rotation about a longitudinal axis for pitch variation, a rod slidably mounted in said mast, links pivotally connected to the upper end of said rod and to the respective, said auxiliary blades, an engine having a propeller carried on the frame of said aircraft, mounted for swinging movement about a horizontal axis, transverse to the craft, to vary the center line of the path of the airstream from the propeller from a direction corresponding to normal forward flight to a direction generally toward the center of rotation of said auxiliary blades, and landing gear on said craft, including a forward unit adapted to hold the forward end of the craft upwardly inclined with respect to its normal attitude in forward flight.

5. A rotary wing aircraft having a generally vertical mast arranged for limited, tilting action, at least in a plane, for and aft of the craft, a sleeve mounted for free rotation on said mast, a first hub mounted on said sleeve, a plurality of main rotor blades carried by said hub, a second hub carried by said sleeve, both said hubs being fixed to said sleeve for rotation therewith, a plurality of auxiliary rotor blades carried by said second hub, substantially shorter than said main blades, and arranged for rotation about a longitudinal axis for pitch variation, pitch control means associated with said auxiliary blades, an engine having a propeller carried on the frame of said aircraft, mounted for swinging movement about a horizontal axis, transverse to the craft to vary the center line of the path of the air stream from the propeller from a direction corresponding to normal forward flight to a direction generally toward the center of rotation of said auxiliary blades, and landing gear on said craft, including a forward unit adapted to hold the forward end of the craft upwardly inclined with respect to its normal attitude in forward flight.

6. A rotary wing aircraft having a generally vertical mast, arranged for limited, tilting action, at least in a plane, fore and aft of the craft, a sleeve mounted for free rotation on said mast, a hub mounted on said sleeve, for rocking movement about a central axis transverse to the hub, and a plurality of rotor blades extending radially from said hub, said blades including at least two main blades, and at least two auxiliary blades with outer ends located radially inwardly of the path of travel of the outer ends of said main blades, pitch control means for said auxiliary blades, a propeller carried on the frame of said aircraft, and mounted for swinging movement about a horizontal axis, transverse to the craft to vary the direction of the airstream from that of normal forward flight to a direction toward the center of rotation of said blades, and landing gear on said craft, including a forward unit adapted to hold the forward end of the craft upwardly inclined with respect to its normal attitude in forward flight.

7. A rotary wing aircraft having a generally vertical mast, arranged for limited, tilting action at least in a plane, fore and aft of the craft, a sleeve mounted for free rotation on said mast, and a plurality of rotor blades extending radially from said sleeve, including at least two main blades, and at least two auxiliary blades with outer ends located radially inwardly of the path of travel of the outer ends of said main blades, pitch control means for said auxiliary blades, a propeller carried on the frame of said aircraft, and mounted for swinging movement about a horizontal axis, transverse to the craft to vary the direction of the airstream from that of normal forward flight to a direction toward the center of rotation of said blades, and landing gear on said craft, including a forward unit adapted to hold the forward end of the craft upwardly inclined with respect to its normal attitude in forward flight.

8. A device as in claim 7, said main and auxiliary blades being mounted in pairs, radially in tandem.

9. A device as in claim 7, said main blades having an inner shaft portion, and said auxiliary blades mounted for pitch-varying rotation on said shaft portions.

10. A device as in claim 7, said main blades being two in number and oppositely disposed, and said auxiliary blades being two in number, oppositely disposed, and arranged at right angles to said main blades.

11. A device as in claim 7, said main blades being two in number and oppositely disposed, and said auxiliary blades being four in number, oppositely disposed in pairs, and located at equi-angular intervals between said main blades.

12. A device as in claim 7, said main blades being two in number, oppositely disposed, and said auxiliary blades being four in number, oppositely disposed in pairs, and located between said main blades.

13. A rotary wing aircraft having a generally vertical mast, arranged for limited, tilting action, at least in a plane, fore and aft of the craft, a sleeve mounted for free rotation on said mast, and a plurality of rotor blades fixed to and extending radially from said sleeve, including at least two main blades, and at least two auxiliary blades with outer ends located radially inwardly of the path of travel of the outer ends of said main blades, pitch control means for said auxiliary blades, and a propeller carried on the frame of said aircraft, and mounted for swinging movement about a horizontal axis, transverse to the craft to vary the direction of the airstream from that of normal forward flight to a direction toward the center of rotation of said blades.

14. A rotary wing aircraft having a generally vertical mast, arranged for limited, tilting action, at least in a plane, fore and aft of the craft, a sleeve mounted for free rotation on said mast, and a plurality of rotor blades fixed to and extending radially from said sleeve, including at least two main blades, and at least two auxiliary blades with outer ends located radially inwardly of the path of travel of the outer ends of said main blades, pitch control means for said auxiliary blades, a propeller on the craft, and means to vary the airstream from the propeller toward and away from the central area of the rotor blades.

15. A device as in claim 14, said main and auxiliary blades being arranged in aligned pairs, radially.

16. A device as in claim 14, said main rotors being located above said auxiliary rotors.

17. A device as in claim 14, said main rotors being located below said auxiliary rotors.

18. A device as in claim 14, said main rotors blades being two in number, oppositely disposed, and said auxiliary rotor blades being two in number, oppositely disposed, and located intermediate said main blades.

19. A device as in claim 14, said main rotor blades being two in number, oppositely disposed, and said auxiliary rotor blades being four in number, oppositely disposed in pairs, and located between said main blades.

20. A rotary wing aircraft comprising a tiltable rotor mast, a main rotor rotatably mounted on said mast, an auxiliary rotor fixed for rotation with said main rotor and of lesser radius than said main rotor, pitch control means for said auxiliary rotor, independent of any pitch control means for said main rotor, a thrust propeller carried by said aircraft, and means to vary the inclination of the rotation axis of said propeller, to shift the airstream, therefrom, temporarily to a path intersecting the blade path of said auxiliary rotor.

21. A rotary wing aircraft comprising a tiltable, generally vertical, rotor mast, a main rotor mounted for free rotation on said mast, an auxiliary rotor of lesser radius than said main rotor, and connected thereto for rotation therewith on a common axis, pitch control means for said auxiliary rotor, independent of any pitch control means for said main rotor, an engine with a forward thrust propeller, and means mounting said engine for swinging movement to vary the inclination of the thrust axis of said propeller toward and away from the area swept by said auxiliary rotor.

References Cited in the file of this patent

UNITED STATES PATENTS

| | | |
|---|---|---|
| 1,786,576 | Nelson | Dec. 30, 1930 |
| 2,130,918 | De Stefano | Sept. 20, 1938 |
| 2,679,364 | Pesaro | May 25, 1954 |
| 2,950,074 | Apostolescu | Aug. 23, 1960 |

FOREIGN PATENTS

| | | |
|---|---|---|
| 264,286 | Great Britain | Jan. 20, 1927 |
| 681,763 | France | Feb. 4, 1930 |
| 330,513 | Great Britain | June 4, 1930 |